(12) United States Patent
Sabavat et al.

(10) Patent No.: US 9,468,090 B2
(45) Date of Patent: Oct. 11, 2016

(54) CURRENT REDISTRIBUTION IN A PRINTED CIRCUIT BOARD

(71) Applicant: Cisco Technology, Inc., San Jose, CA (US)

(72) Inventors: Goutham Sabavat, Bangalore (IN); Javid Mohamed, San Diego, CA (US); Subramanian Ramanathan, Bangalore (IN); Stephen A. Scearce, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 13/662,651

(22) Filed: Oct. 29, 2012

(65) Prior Publication Data

US 2014/0118962 A1    May 1, 2014

(51) Int. Cl.
*H05K 1/02*    (2006.01)

(52) U.S. Cl.
CPC ........... *H05K 1/0265* (2013.01); *H05K 1/0224* (2013.01); *H05K 2201/093* (2013.01); *H05K 2201/0969* (2013.01); *H05K 2201/09681* (2013.01)

(58) Field of Classification Search
CPC ............. H05K 1/0265; H05K 1/0224; H05K 2201/0969; H05K 2201/09681; H05K 2201/093
USPC .......................................................... 361/794
See application file for complete search history.

(56) References Cited

U.S. PATENT DOCUMENTS

| | | | |
|---|---|---|---|
| 4,328,530 A * | 5/1982 | Bajorek et al. | 361/762 |
| 5,523,921 A * | 6/1996 | Van Lydegraf | 361/818 |
| 5,841,074 A * | 11/1998 | Egan et al. | 174/250 |
| 5,898,576 A * | 4/1999 | Lockwood et al. | 361/782 |
| 5,912,809 A * | 6/1999 | Steigerwald et al. | 361/780 |
| 5,993,224 A | 11/1999 | Quillet et al. | |
| 6,118,334 A * | 9/2000 | Tanaka et al. | 327/565 |
| 6,150,895 A * | 11/2000 | Steigerwald et al. | 333/12 |
| 6,372,996 B2 * | 4/2002 | Lin et al. | 174/250 |
| 6,496,383 B1 * | 12/2002 | Herrell et al. | 361/780 |
| 6,630,631 B1 | 10/2003 | Dishongh et al. | |
| 6,646,886 B1 | 11/2003 | Popovich et al. | |

(Continued)

FOREIGN PATENT DOCUMENTS

WO    WO2012039269 A1    3/2012

OTHER PUBLICATIONS

International Search Report and Written Opinion from PCT/US2013/047492, Mar. 17, 2014, WO.

(Continued)

*Primary Examiner* — David M Sinclair
*Assistant Examiner* — Theron Milliser
(74) *Attorney, Agent, or Firm* — Lempia Summerfield Katz LLC

(57) ABSTRACT

In one implementation, a multilayered printed circuit board is configured to redirect current distribution. The current may be distributed by steering, blocking, or otherwise manipulating current flows. The multilayered printed circuit board includes at least one power plane layer. The power plane layer does not distribute current evenly. Instead, the power plane layer includes multiple patterns with different resistances. The patterns may include a hatching pattern, a grid pattern, a directional pattern, a slot, a void, or a continuous pattern. The pattern is a predetermined spatial variation such that current flows in a first area differently than current flows in a second area.

12 Claims, 12 Drawing Sheets

(56) References Cited

U.S. PATENT DOCUMENTS

| | | | |
|---|---|---|---|
| 6,703,706 B2* | 3/2004 | Audet et al. | 257/713 |
| 6,727,435 B1* | 4/2004 | Egan et al. | 174/250 |
| 6,846,993 B2* | 1/2005 | Matsui | 174/262 |
| 6,976,235 B2* | 12/2005 | Bobba et al. | 716/111 |
| 7,032,207 B2* | 4/2006 | Kurose et al. | 716/113 |
| 7,361,843 B2* | 4/2008 | Lentschke et al. | 174/255 |
| 7,979,983 B2 | 7/2011 | Bird et al. | |
| 2004/0053497 A1* | 3/2004 | Perlov et al. | 438/684 |
| 2004/0073878 A1* | 4/2004 | Hasegawa et al. | 716/8 |
| 2006/0125067 A1* | 6/2006 | Wehrly et al. | 257/679 |
| 2006/0169487 A1 | 8/2006 | Harrer et al. | |
| 2007/0279881 A1* | 12/2007 | Weir et al. | 361/794 |
| 2007/0279882 A1* | 12/2007 | Weir et al. | 361/794 |
| 2007/0295818 A1* | 12/2007 | Li et al. | 235/472.01 |
| 2008/0257592 A1* | 10/2008 | Harrer et al. | 174/255 |
| 2013/0170155 A1 | 7/2013 | Kashiwakura | |

OTHER PUBLICATIONS

International Preliminary Report on Patentability from PCT Appl. No. PCT/US2013/47492, May 14, 2015, WO.

* cited by examiner

CURRENT REDISTRIBUTION IN A PRINTED CIRCUIT BOARD

TECHNICAL FIELD

This disclosure relates in general to the field of printed circuit boards, more particularly, to printed circuit boards with high current applications.

BACKGROUND

A printed circuit board (PCB) is used in nearly every consumer and industrial electronic device. The PCB structurally supports multiple electronic components. Traces on the PCB supply signals to the electronic components. A PCB may have a one-sided single layer, a double-sided single layer, or multiple layers. PCBs with multiple layers have one or more layers of "printed" circuits separated by one or more layers of insulation. The electronic components on the surface connect through plated holes drilled down to a specific layer of printed circuit.

The increasing high current can cause burnouts, open circuits, or brownouts because adequate area is not available on the PCB for power supply. Further, such current crowding leads to high resistance (IR) drop. The increased IR drops affects the power deliver to components based on length of the current path. The increased IR drops cause additional thermal heat, which may cause de-lamination of the PCB.

In addition, some high density PCBs have limited space for through hole vias that transfer currents to other layers. If fewer through hole vias fit on the PCB, more current travels through each via, creating currents above tolerable levels.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, an apparatus, such as a printed circuit board includes a signal layer, a power plane layer, and an insulating layer between the signal layer and the power plane layer. The power plane layer comprises a conductive sheet having a predetermined spatial variation such that current flows in a first area differently than current flows in a second area.

In another embodiment, an apparatus, such as a printed circuit board includes an insulating substrate layer and a power plane layer. The power plane layer includes a first pattern of conducting material and a second pattern of conducting material. The power plane layer is adjacent to the insulating substrate layer. The first pattern of conducting material is configured to steer a first flow of current in a predetermined direction and the second pattern of conducting material is configured to steer a second flow of current differently than the first pattern. The first pattern of conducting material and the second pattern of conducting material are substantially at a common potential.

In another embodiment, a method includes receiving electrical current at a power plane of a multilayer printed circuit board, steering current in a first direction in the power plane based on a first pattern of conducting material, and steering current in a second direction in the power plane based on a second pattern of conducting material.

Example Embodiments

A challenge in high end routing platforms is printed circuit board (PCB) density. Each generation of electronics demands significant increases in current, yet PCB space generally stays the same. The resulting increase in current density pushes the limits of through hole vertical interconnect accesses (vias) near load devices, such as voltage regulator modules. Due to positioning, different load devices may undesirably receive different amounts of current. The relative current distribution depends on the resistance from source to load. Selectively increasing the resistance in a path redistributes the current. The following embodiments include techniques to selectively redistribute current in a power plane of the PCB.

Figure 1:
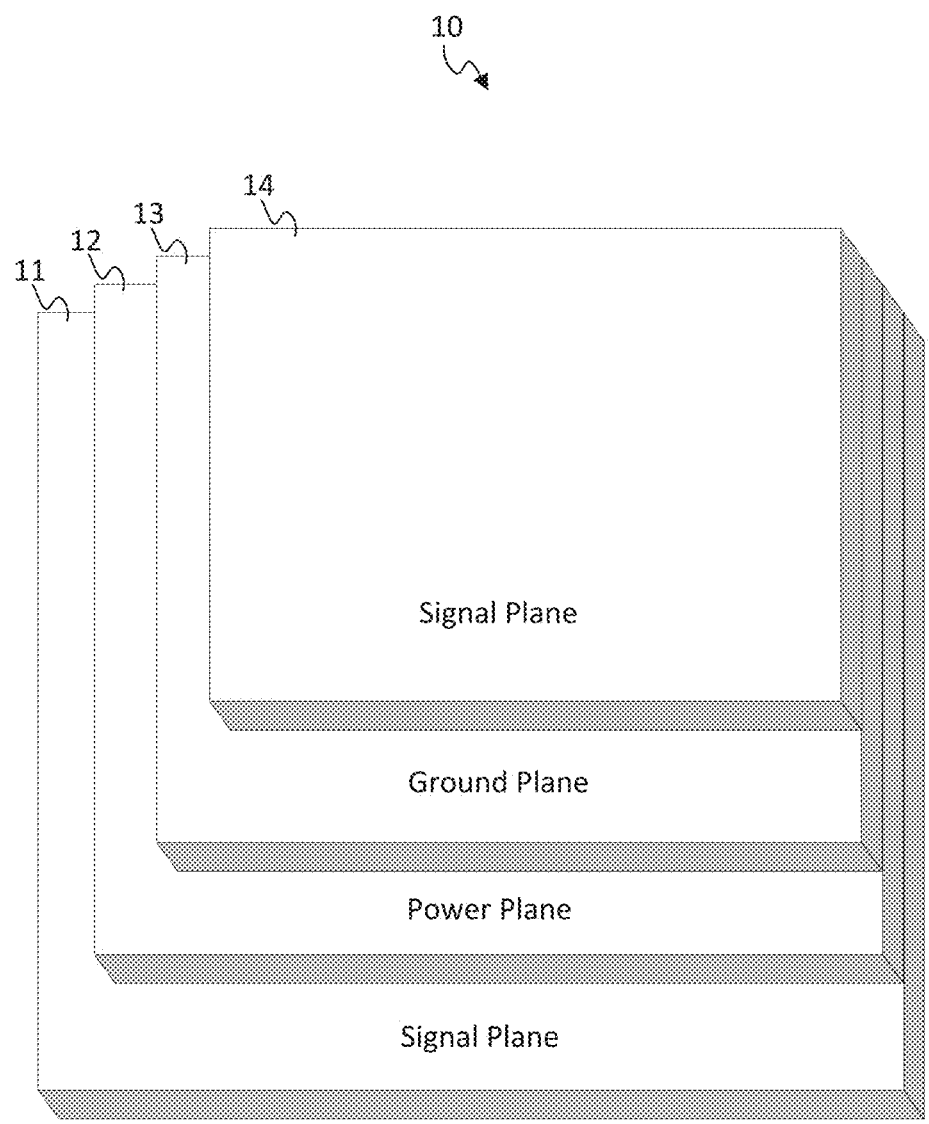
FIG. 1 illustrates a multilayered printed circuit board (PCB).

FIG. 1 illustrates a multilayered printed circuit board 10. The multilayered printed circuit board 10 may have any number and/or types of layers or planes. The multilayered printed circuit board 10 shown in FIG. 1 includes a first signal plane 11, a power plane 12, a ground plane 13, and a second signal plane 14. The printed circuit board 10 may include the ground plane 13 and power plane 12 separated by one or more other layers or may include signal planes 11 and 14 in adjacent layers. In addition, the printed circuit board 10 may include multiple power planes. The multiple power planes may include one or more parallel paths for current from the same or different power supplies to reach a load device.

The signal planes 11 and 14 include signal traces to carry signal currents between electronic components electrically coupled to the signal layer. The power plane 12 delivers current to the signal places 11 and 14. The signal current may include AC signals, DC signals, or both. The signal planes 11 and 14 may be formed by various processes. One example process is an additive process, in which a conductive material is plated, added, or printed on the surface of a substrate in paths that electrically connect electronic components. Another example is a subtractive process, in which a conductive material is plated, added, or printed across an entire substrate, and the desired paths are created by etching away or subtracting the undesired portions of the conductive material. The conductive material may be copper or another material.

The signal planes 11 and 14 are electrically connected to the power plane 12 and ground plane 13 through one or more vias. A via is an electrical connection between two or more planes or layers in a PCB. A via may be a piece of metal that provides the electrical connection. A via may comprise a pad at each or both ends. A pad is a small area of conductive material, such as copper. A via may comprise a hole with a conductor through one or more layers of the PCB.

A via may be formed by drilling through the one or more layers and plating the inner surface of the drilled hole with conductive material. The via may be rated for a current based on the size of the via. The rated current may be proportional to the diameter of the via or proportional to the cross section area of the via. Examples of rated currents and via sizes include 10 mils at 1.7 amps, 15 mils at 2.2 amps, and 25 mils at 3.2 amps. Other via sizes and rated currents may be used. The rated current may also depend proportionally on the plating thickness for the via.

Some electrical components, such as microprocessors, require high currents with a fixed voltage. A voltage regulator module supplies high currents with a fixed voltage through a DC to DC converter. The space around the voltage regulator module includes several vias large enough to supply the high currents to other layers. However, space is limited. Some vias are closer to the sink (or source) of the current. These closer vias are part of shorter paths for the current. Shorter paths have smaller resistances, and, through current divider principles, carry more current. Increased currents can exceed the rated levels for the vias. The following embodiments direct current in the printed circuit board to steer currents and/or block currents.

In traditional embodiments, the power plane 12 and ground plane 13 may be formed from continuous sheets of conductive material. The continuous sheet of conductive material may be referred to a full pour, full copper pour, or a solid plane. The sheet of conductive material has a substantially uniform resistance. A substantially uniform resistance is a resistance that varies within a tolerance (e.g., 0.1%, 1%, 5%). Alternatively, a substantially uniform resistance may be defined such that the source to load resistance causes a voltage drop smaller that a predetermined value. The predetermined value (e.g., 0.1 volts, 0.3 volts) may be tolerable variation from the required logic levels of the electronic component (e.g., 1.5 volts, 5.0 volts). The predetermined value may vary among electronic components in the same PCB.

The following embodiments include power planes that are not a continuous sheet of conductive material and/or do not have a substantially uniform resistance. Discontinuous patterns are employed to selectively steer current in directions away from over utilized vias toward underutilized vias. Portions of the continuous sheet of conductive material may be removed to form the discontinuous pattern.

The discontinuous pattern may be a hatched pattern, a directional pattern, a slot pattern, or an isolation pattern. A hatched pattern is a grid or mesh of conductive material. The hatched pattern is defined by the width of the conductive pattern and the width of the gap between adjacent conductive portions. The hatched portion includes conductive sections extending in two or more directions. A directional pattern includes conductive portions extending in one direction. A slot pattern is a gap in the conductive material. The slot pattern may be L-shaped, U-shaped, half-U shaped or another shape. An L-shaped slot pattern extends in two directions. An L-shaped slot pattern redirects current on two sides of a via or another circuit element. A U-shaped slot pattern is curved or otherwise extends in three directions. A U-shaped slot pattern redirects current on three sides of a via or another circuit element. A half-U shaped slot pattern includes three or more segments to redirect current on two sides of a via or another circuit element. An isolation pattern is a gap in the conductive pattern that surrounds a via. Other patterns or combinations of patterns may be used.

Figure 2:
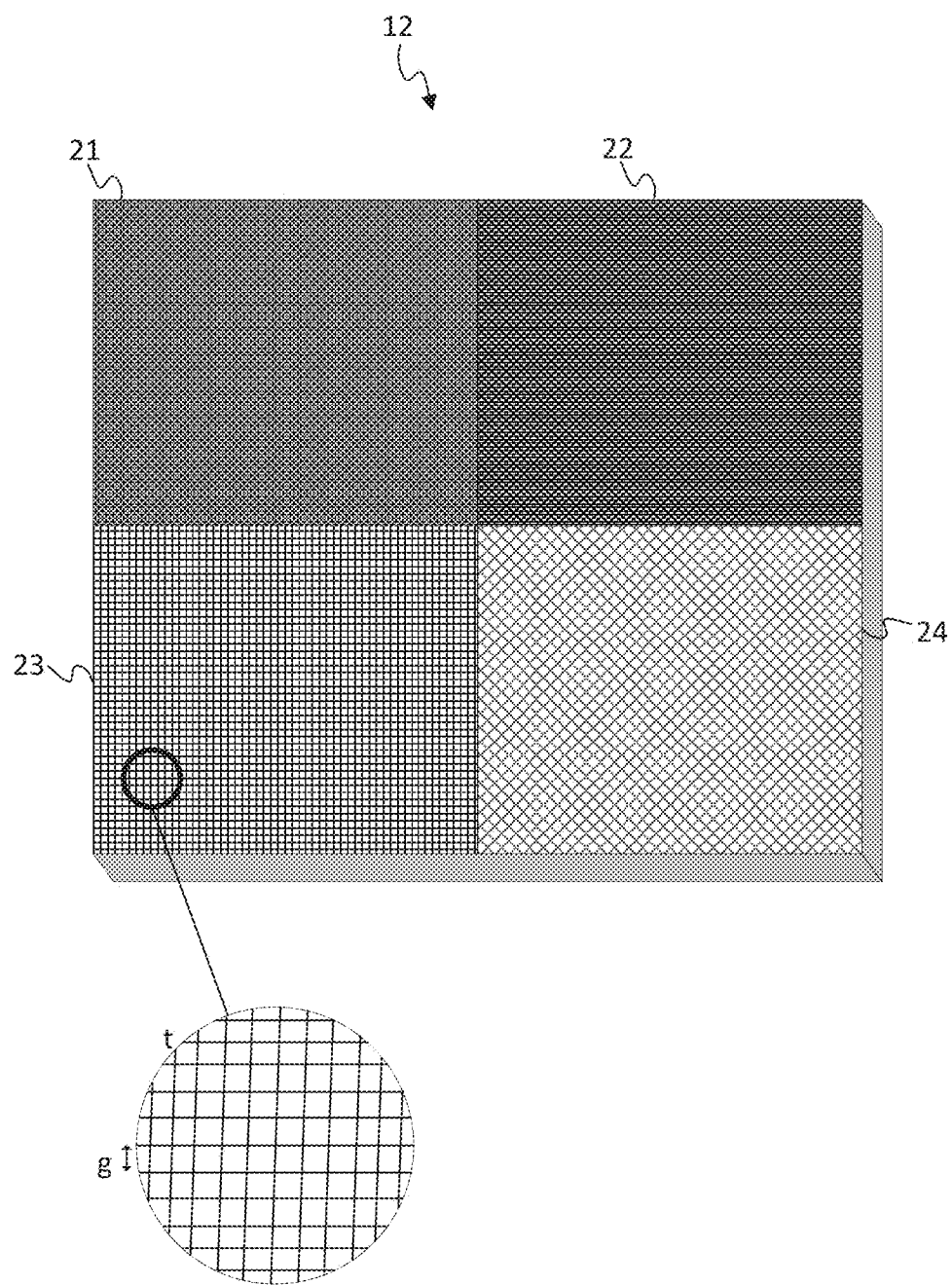
FIG. 2 illustrates an example power plane of the multilayered PCB of FIG. 1.

FIG. 2 illustrates an example power plane layer 12. The power plane layer 12 includes multiple patterns in the conductive sheet. One or more of the patterns includes a predetermined spatial variation such that current flows in a first area differently than current flows in a second area. Current flows differently because a resistance in the first area or pattern is different than a resistance in the second area or pattern. The resistances may be measured in ohms per square unit (e.g., "ohms per square").

The example shown in FIG. 2 includes four patterns or areas. The areas are the same or different sizes and/or shapes. As shown in FIG. 2, each area is a same size square. In other embodiments, one are is formed from two or three of the quadrants. In yet other embodiments, one area is a surrounding ring shape and another area is an internal block (e.g., donut hole). Any separation or division of areas may be used. Any number of areas may be used.

Each of the areas has a different predetermined spatial variation defined by a grid pattern. Area 22 includes a dense grid. Area 24 includes a sparse grid. Areas 21 and 23 have intermediately spaced grids. Each of the four patterns or areas is defined by a grid size and a gap size. The grid size is the thickness (t) of the conductive portion of the pattern. Example thicknesses include 1 millimeter, 10-100 mils, or 100-800 microns. The gap size (g) is the space between conductive portions. Example spaces include 1 millimeter, 50-900 mils, or 500-1000 microns. Any combination of grid size and gap size may be used to create a discontinuous pattern of conductive material with a specific resistance. In other embodiments, the pattern in a given area may vary as a function of location, such as having the gap size transition between two values across the area in one or more directions.

The patterns may be defined by the ratio of the conductive material size to the gap size. Example ratios include 1, ½, and ¼. The patterns may also be defined by a percentage that describes how much of the conductive material is left in the sheet. Example coverage percentages include 10%, 50%, and 90%. In one embodiment, the coverage percentage is between 40% and 95% of the size of the insulating layer.

The differences in resistance between the areas steer the current because current takes the path of least resistance. In one example area 24 has a resistance of 50 milliohms per square, area 23 has a resistance of 40 milliohms per square, area 22 has a resistance of 25 milliohms per square, and area 21 has a resistance of 10 ohms per square.

The grids may be aligned from one area to the next or the grids may run in different directions. For example, area 23 includes conductive portions that run vertically and horizontally, and area 24 includes conductive portions that run diagonally. Current may flow through area 24 vertically, but that path is longer, and the resistance is higher, that a path that extends diagonally through area 24.

Figure 3:
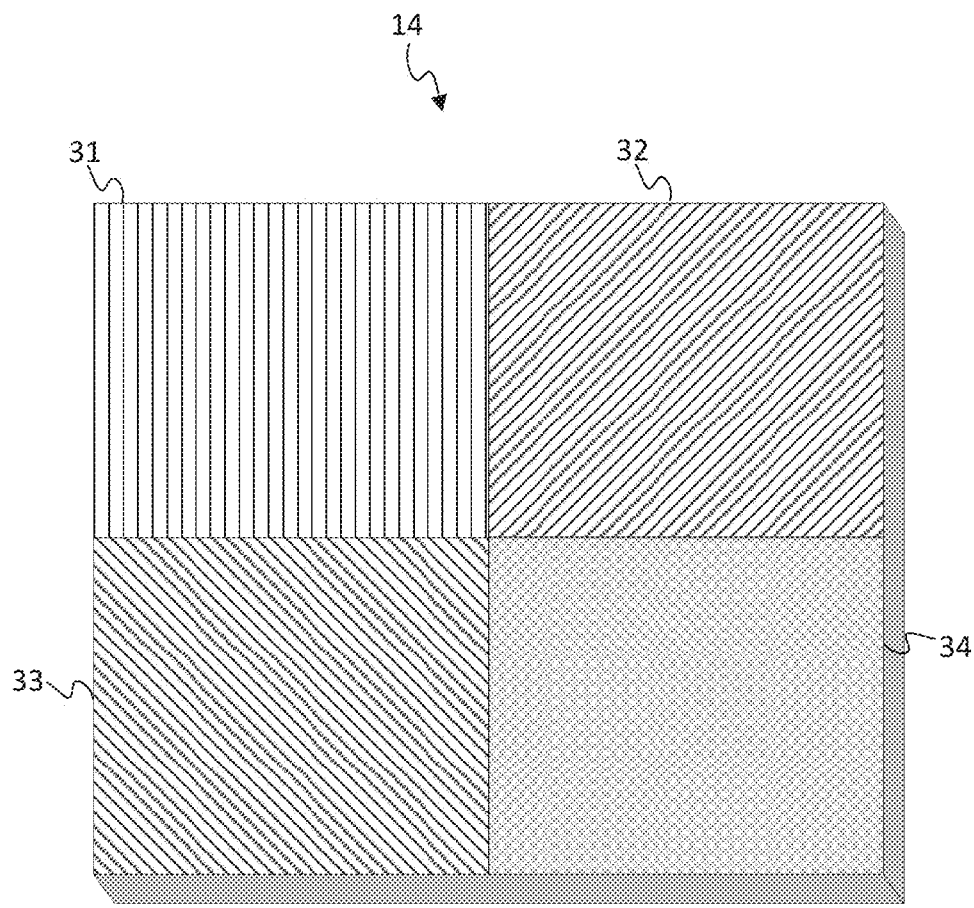
FIG. 3 illustrates another example power plane of the multilayered PCB of FIG. 1.

FIG. 3 illustrates another example power plane layer 12. The power plane layer 12 includes a directional pattern configured to steer current. The power plane layer 12 includes areas 31-34. Each of areas 31-33 includes conductive portions extending in a single direction defining a direction pattern. Each of the areas 31-33 has a high resistance in one direction and a low resistance in another direction. A low resistance may be 1-10 milliohms per centimeter. A high resistance may be 1-10 kilohms per centimeter.

For example, current in area 31 flows only vertically. The gaps between the conductive portions prevent current from flowing in another direction. Current in areas 32 and 33 flows only diagonally. Area 34 is a continuous portion. None of the conductive material in area 34 has been removed from the sheet. Currents flow uninhibited in several or all directions in area 34.

Figure 4:
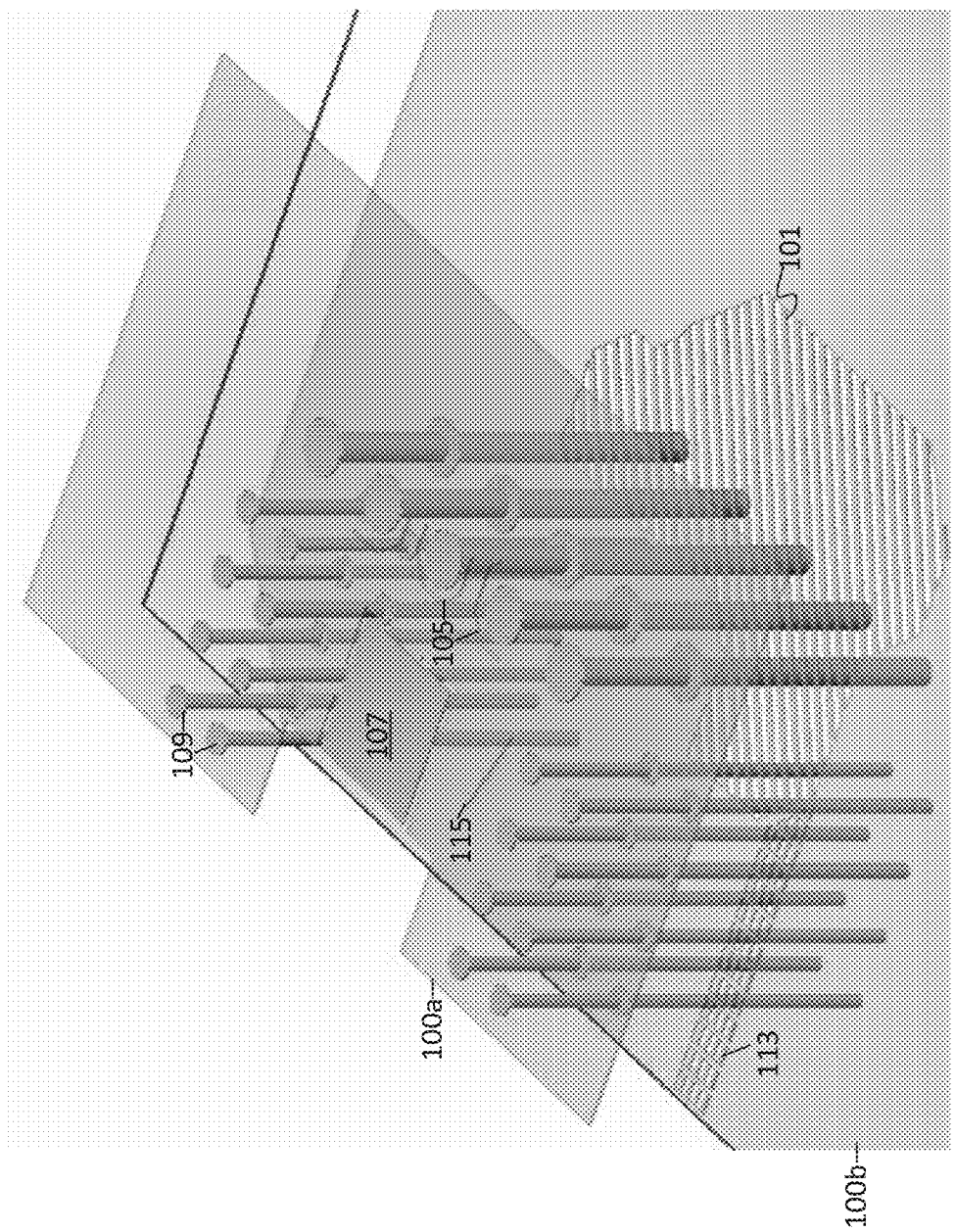
FIG. 4 illustrates a three-dimensional view of an example multilayered printed circuit board.
Figure 5:
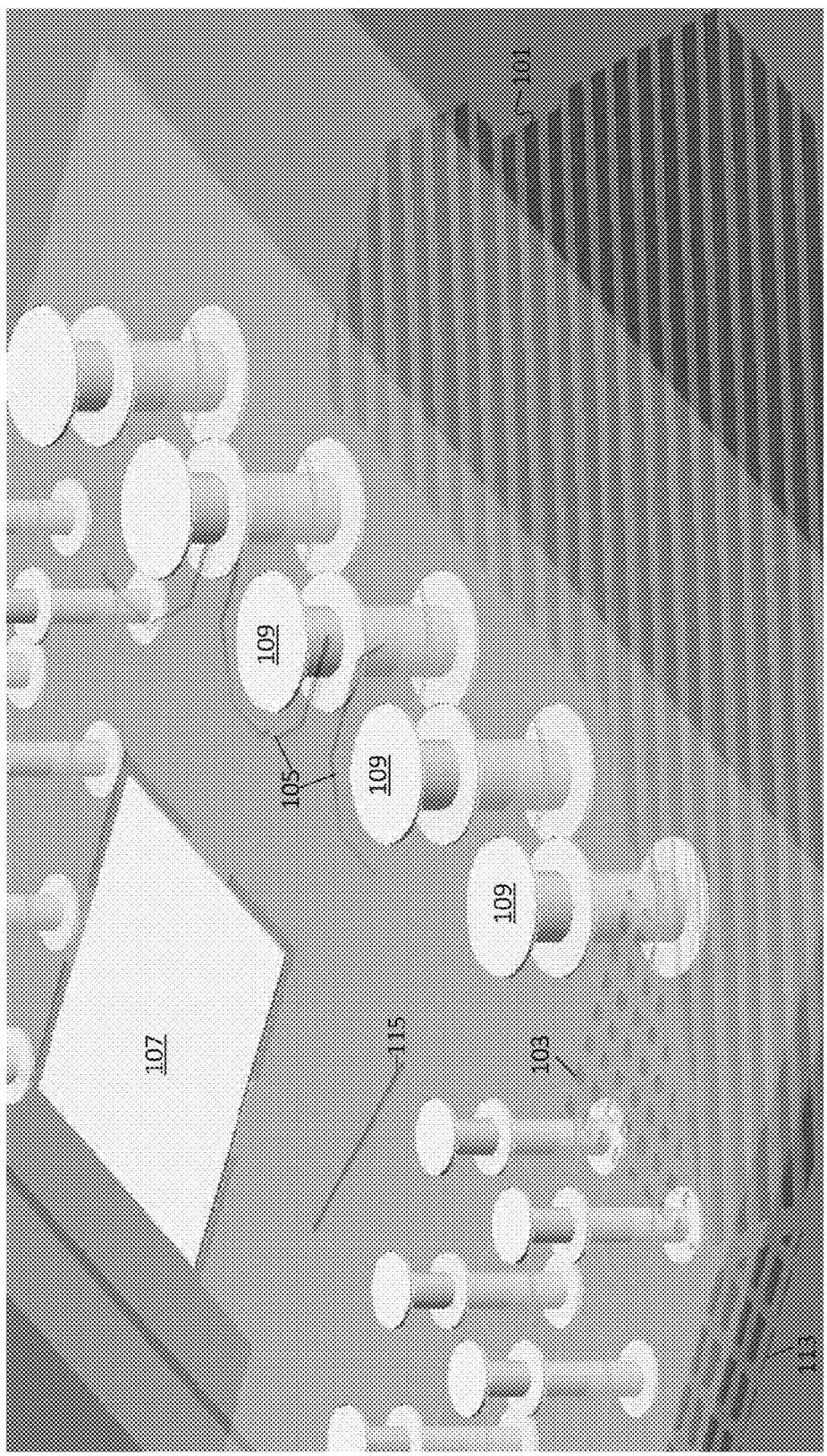
FIG. 5 illustrates another three-dimensional view of the multilayered printed circuit board of FIG. 4.
Figure 6:
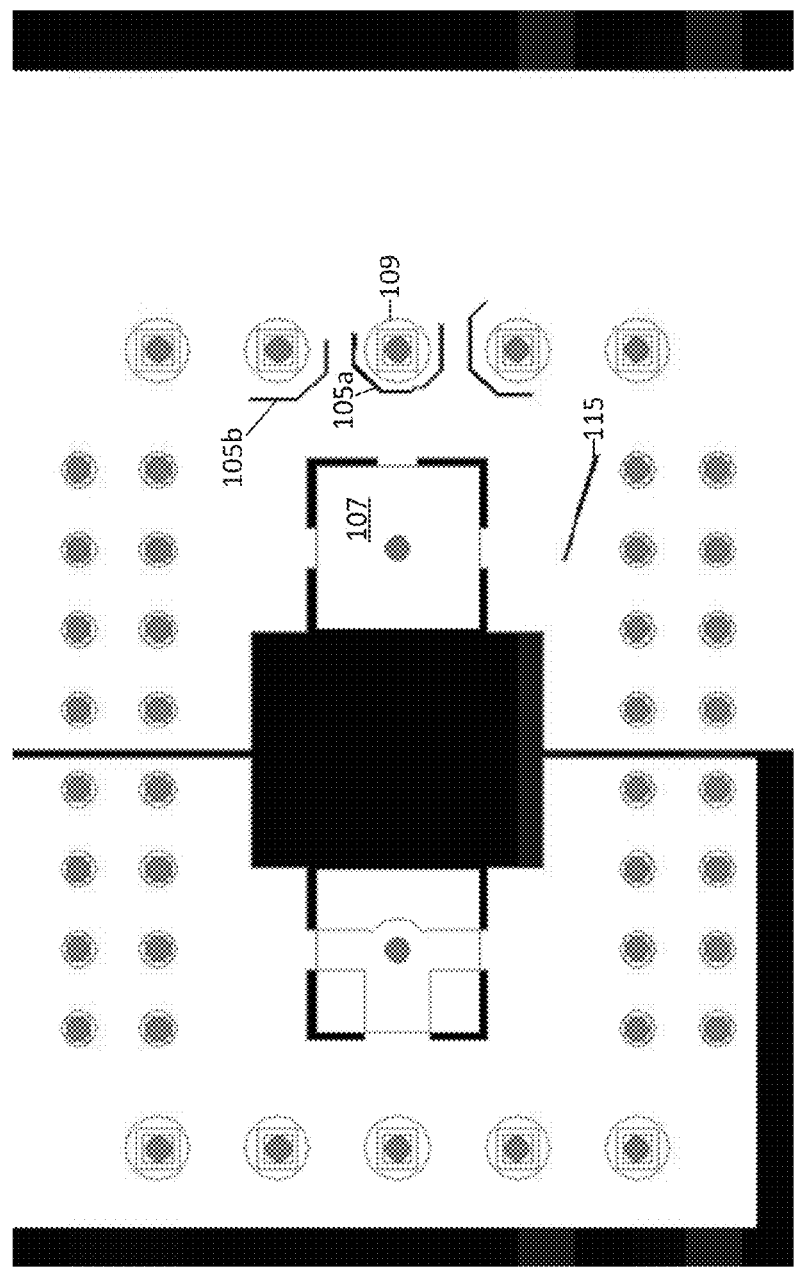
FIG. 6 is a top down view of the multilayered printed circuit board of FIG. 4.

FIGS. 4 and 5 illustrate two three-dimensional views of a multilayered PCB. FIG. 6 is a top down view of the multilayered PCB. The PCB includes layers 100a-b. Layer 100b is a power plane layer. Layer 100a is a top layer. The top layer redistributes current among vias 109. Other layers including current traces are included but not shown so that the power plane layer 100b is visible. In one embodiment, the top layer 100a is considered a power plane layer even if no power supply is included in the top layer 100a. The top layer 100a can be manipulated to distribute current flows.

Figure 7:
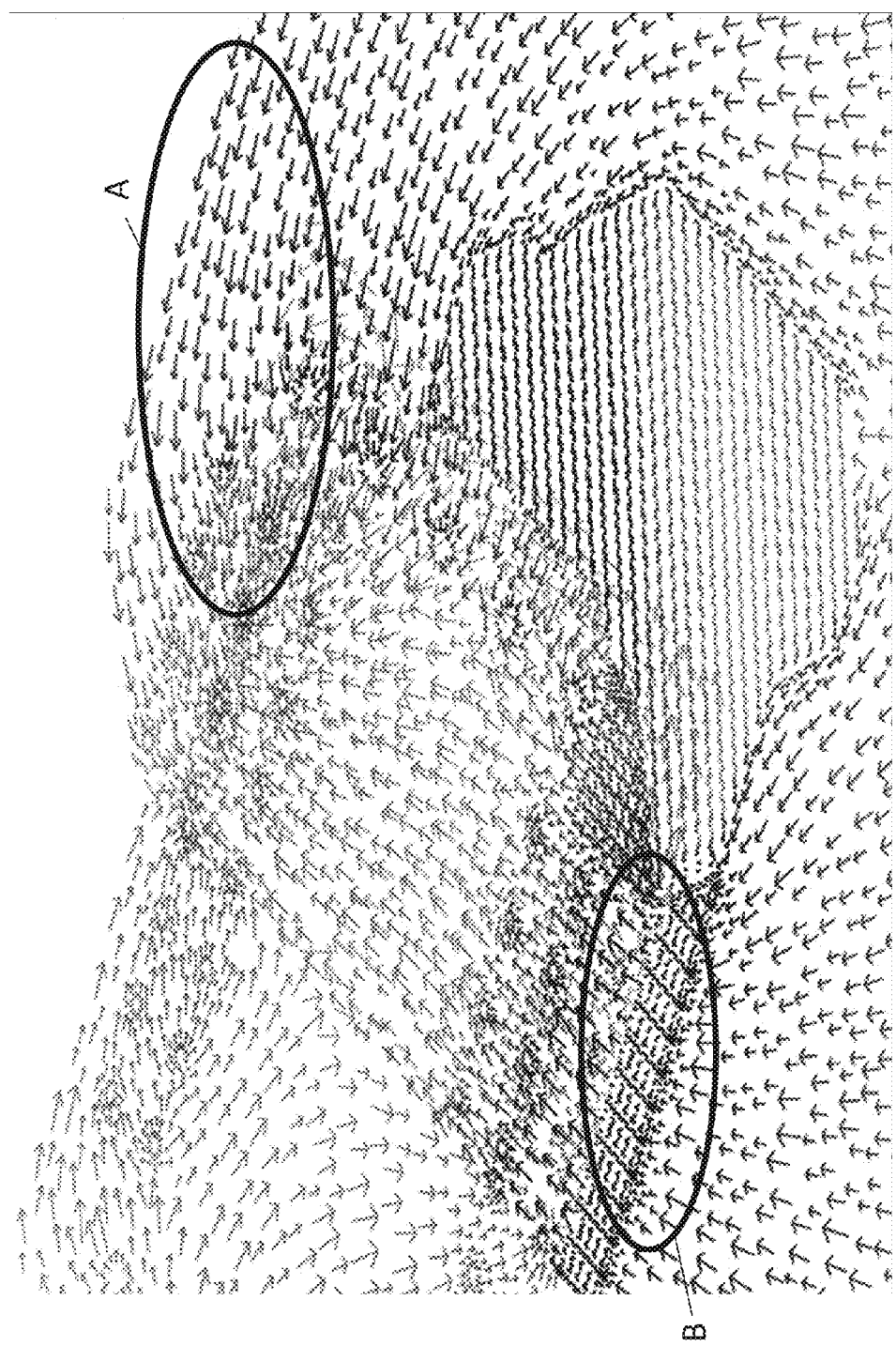
FIG. 7 illustration a current map of the power plane multilayered PCB of FIG. 4.

The power plane layer 100b includes multiple patterns. A directional pattern 101 steers current, at least in part, away from nearby vias. The direction pattern 101 has a high resistance in most directions and a low resistance in one direction. Current exiting the direction pattern 101 toward the current device 107 flows to a first hatched pattern 103 and a second hatched pattern 113. The first hatched pattern 103 and the second hatched pattern 113 have different resistances. In addition, the first hatched pattern 103 and the second hatched pattern 113 steer a majority of the current flow in different directions, as shown in FIG. 7.

In addition or in the alternative, the layer 100b includes one or more gaps to steer current. A linear gap 115 extends in one direction and blocks some current flows from selected vias. An angled gap 105a-b extends in more than one direction. For example, the angled gap 105a in FIG. 5 is U-shaped and the angled gap 105b is half U-shaped. Other shapes and sizes of gaps may be included to steer current. The angled gaps 105a-b partially surround specific vias.

In one example the distance between the angled gap 105a and the current device 107 is 38 mils, the widest portion of the angled gap 105a is 52 mils, and the distance between angled gaps 105a and 105b is 18 mils. Other distances may be used in any arrangement, which may be selected automatically or manually.

One or more vias 109 extend through the multilayered PCB. A portion of the conductive area around selected vias 109 may be removed to create a void surrounding just part of the vias 109. The void may be placed between the via and the current device 107 to increase a travel path to the via 109. The void may have other positions and reduce the current by limiting the area of connection to the power plane.

The current device 107 may be a current source or a current sink. In one example, the current device 107 is an output inductor that draws current from the power plane layer 100b. In another example, the current device 107 is a voltage regulator module that supplies power to other devices.

The current device 107 may be a power supply that supplies power to the power plane layer 100b. The power supply is at substantially the same potential as the power plane layer 100b. Substantially the same potential means within that the voltage of the power plane layer 100b stays within a range of the voltage of the power supply. Small resistances in the power plane layer 100b cause the voltage to vary slightly.

FIG. 7 illustrates a current map of the power plane 12. The current map illustrates the various direction of current flow in the power plane 12. The directional pattern 101 forces some current to take a long path near region A in the current map. The first hatched pattern 103 and the second hatched pattern 113 cause less current to head toward the vias in region B.

Figure 8:
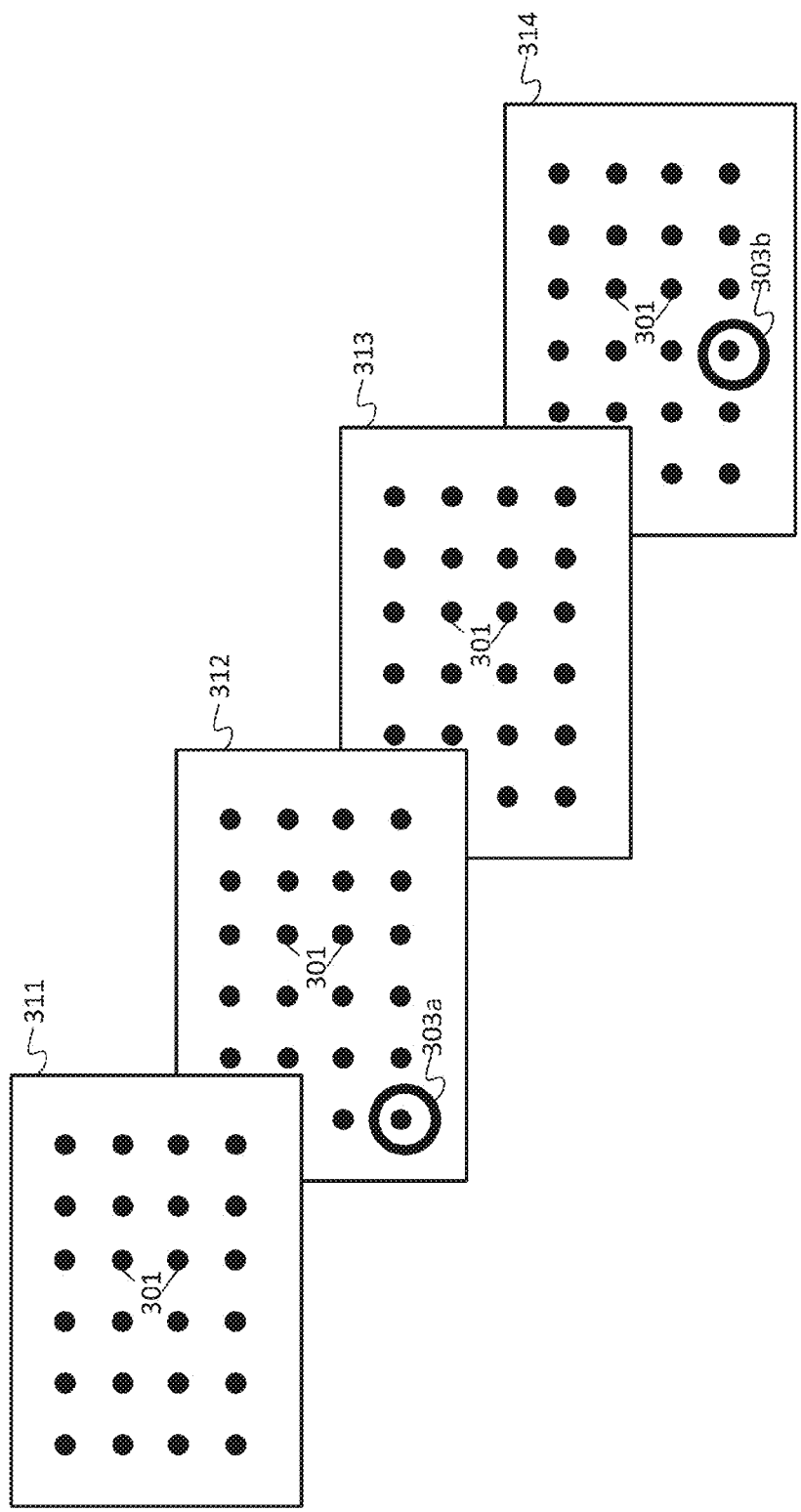
FIG. 8 illustrates expanded layers of another example multilayered printed circuit board.

FIG. 8 illustrates expanded layers of the three-dimensional view of the multilayered printed circuit board of FIG. 5. The multilayered printed circuit board includes four layers. Power plane layer 312 and ground layer 313 are sandwiched by signal layers 311 and 314. A void 303a in the power plane layer 312 and a void 303b in signal layer 314 are formed around selected vias to stop current from flowing through the vias. Instead, current is forced to paths through other vias connected to other layers connected in parallel such as top layer 100a.

Figure 9:
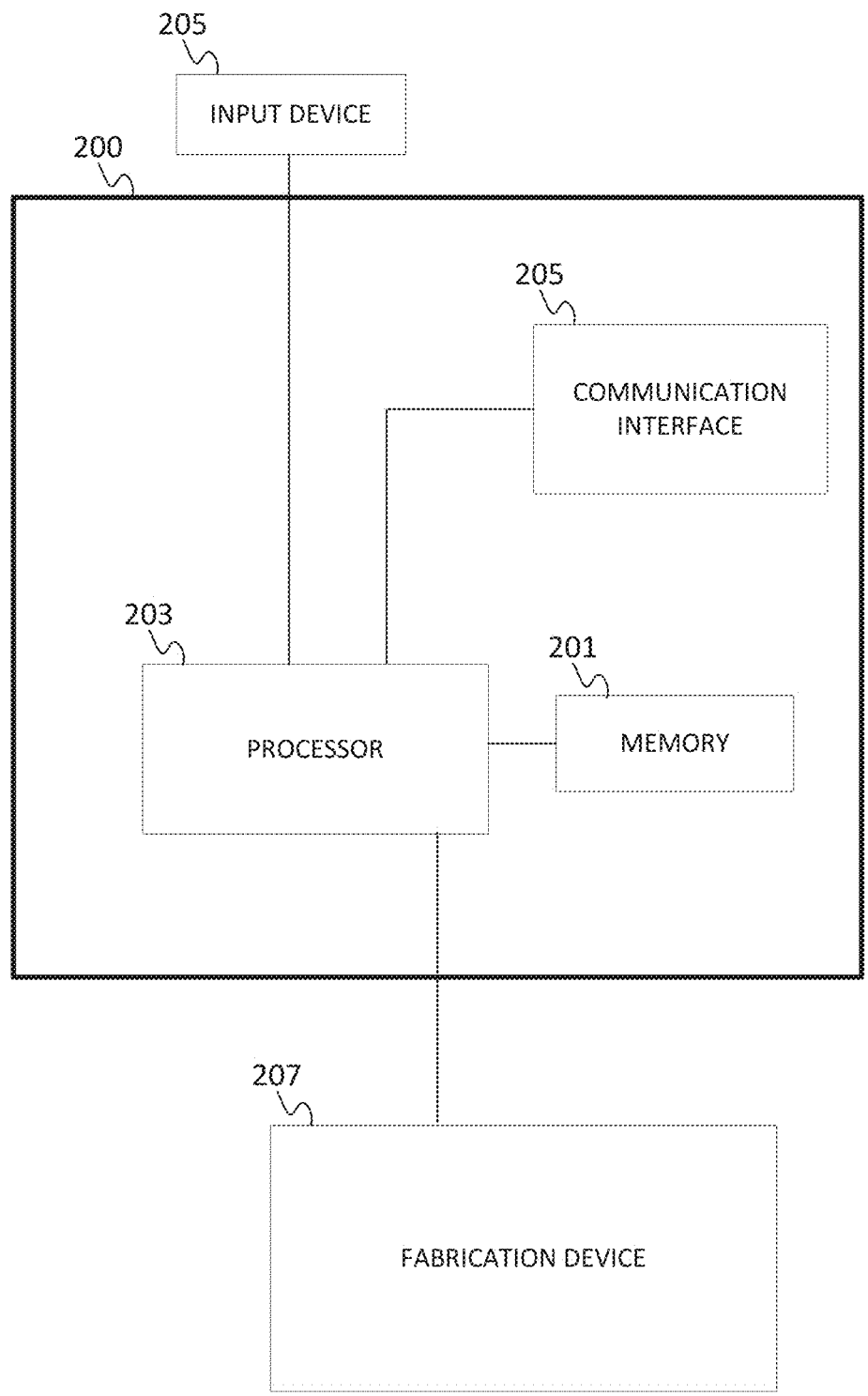
FIG. 9 illustrates a fabrication device for manufacturing a multilayered printed circuit, according to one embodiment.

FIG. 9 illustrates devices for manufacturing a multilayered printed circuit. The devices include an input device 205, a control device 200, and a fabrication device 207. The control device 200 includes at least a memory 201, a processor 203, and a communication interface 205.

The control device 200 receives input from a user via the input device 205 to create the multilayered PCB described above. The user may arrange electrical components including current devices and vias on a display. The control device 200 is configured to access rating data for the current devices and vias stored in memory 201. The control device 200 models or simulates the proposed circuitry to determine whether any via current exceeds the ratings. That is, the input device 205 receives location selections for various current sources and current sinks. The control device 200 models the current density of one or more layers of the multilayered PCB. Alternatively, the control device 200 receives a pattern for the power plane without accessing rating.

When a via current exceeds rated levels, the control device 200 inserts a current steering feature in the power plane of the multilayered PCB. Examples current steering elements are grid sections of conductive material and slots where the conductive material has been removed. The control device 200 selects preferred or possible locations for the current steering element based on the simulations. Alternatively, the user may manually enter types and locations of the current steering elements via the input device 205. Alternatively, trial and error may be used to select and place the current steering elements.

The control device 200 generates an image or map for the multilayered PCB. The image includes the power plane layer and the signal layer. The power plane includes multiple patterns for steering current flows and the signal layer includes multiple signal traces.

The fabrication device 207 receives the image of map of the multilayered PCB from the control device 200. In a subtractive process, the fabrication device 207 generates a negative of the image. The negative is placed over the copper and the corresponding portions are etched away. In the additive process, the image of the multilayered PCB is used as a mold for pouring the copper.

Figure 10:
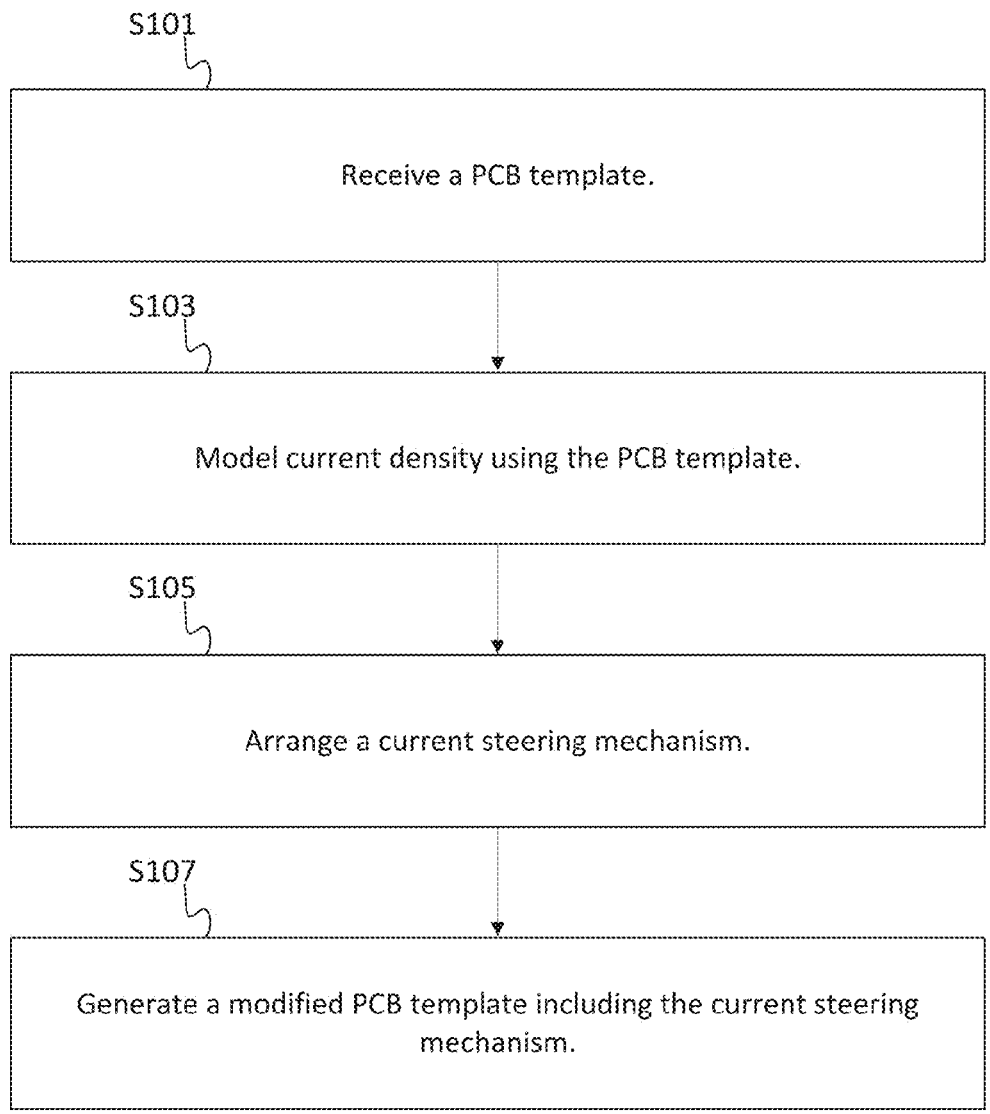
FIG. 10 illustrates an example flowchart for a fabrication process for a printed circuit board with current redistribution.

FIG. 10 illustrates a flow chart for a fabrication process for a printed circuit board with current redistribution. The acts are performed in the order shown, but other orders may be used. Additional, different, or fewer acts may be provided.

At act S101, the control device 200 receives a PCB template from the input device 205. The PCB template may include data indicative of a number of layers and placement of electrical components, vias, current sources, and current sinks.

At act S103, the control device 200 is configured to model the PCB template for current density. The model may include circuit simulation software. The current density may be stored or displayed in a current density map of current magnitude and directions in the various layers of the PCB. From the current density map, the control device 200 determines whether any of the currents exceed rated levels. The rated levels may be associated with vias or the power plane layer. The rated levels may be defined by a drill diameter used to drill the vias through insulating layers of the PCB.

At act S105, when current levels exceed the rated levels, the control device 200 is configured to arrange a current steering mechanism in the PCB template. Arranging the current steering mechanism may include converting a portion of the power plane layer to a hatch pattern or inserting a void into the power plane layer. The void is a gap in the conductive material. Acts S103 and S105 may be repeated as necessary to avoid excessive currents.

At act S107, the control device 200 generates a modified PCB template including the current steering mechanism. The modified PCB template is sent to the fabrication device 207. The fabrication device 207 may be configured for an additive process and/or a subtractive process. In the subtractive process, the fabrication device 207 receives substrates with copper already applied and removes copper from specific areas. The removal process may include silk screen printing, photoengraving, or milling. In silk screen printing, ink is printed across copper a substrate and etching is used to remove the unwanted portions of the copper. In photoengraving, a photomask and a developer are used to remove a coating that protects the copper and etching is used to remove the unwanted portions of the copper. In milling, a PCB prototype removes copper from the substrate.

In the additive process, the fabrication device 207 adds copper to a bare substrate through electroplating. A photosensitive film is exposed to light through a mark and the developed with a chemical path containing palladium which makes the exposed areas capable of bonding to copper which is plated.

The processor 203 may include a general processor, digital signal processor, an application specific integrated circuit (ASIC), field programmable gate array (FPGA), analog circuit, digital circuit, combinations thereof, or other now known or later developed processor. The processor 203 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the control device 200, such as a secure digital (SD) memory card.

The input device 205 includes one or more buttons, keypad, keyboard, mouse, stylist pen, trackball, rocker switch, touch pad, voice recognition circuit, or other device or component for inputting data to the control device 200. The input device 205 and a display may be combined as a touch screen, which may be capacitive or resistive. The display may be a liquid crystal display (LCD) panel, light emitting diode (LED) screen, thin film transistor screen, or another type of display.

The control device 200 may include instructions on a computer-readable medium, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 11:
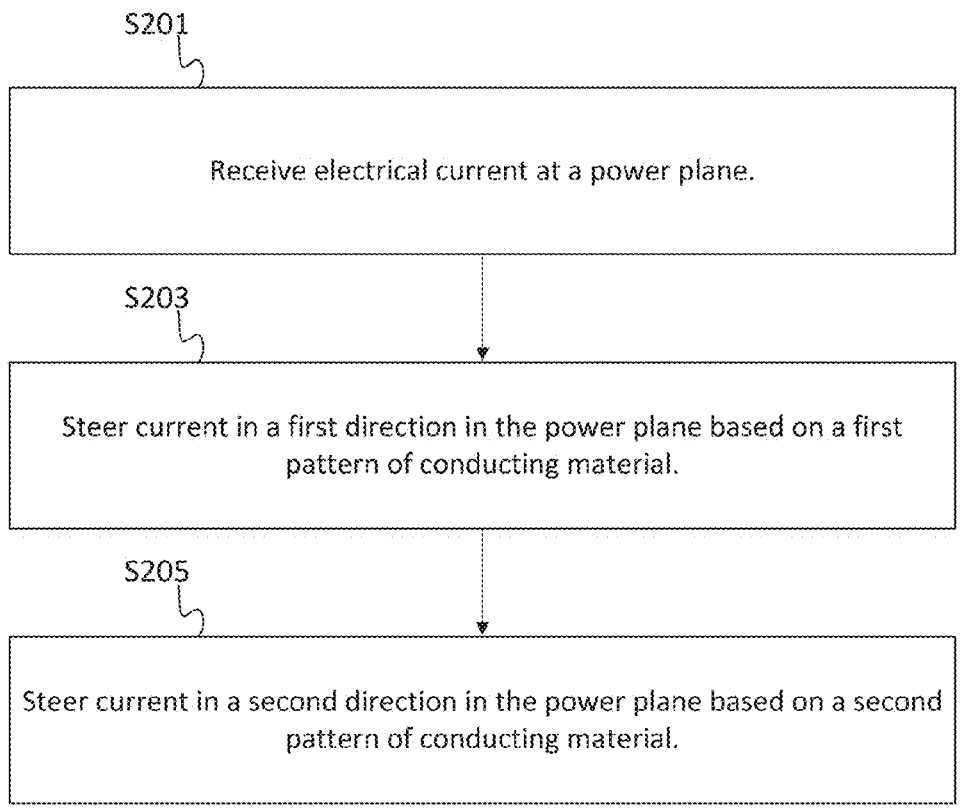
FIG. 11 illustrates an example flowchart for a process for current redistribution in a power plane.

FIG. 11 illustrates an example flowchart for a process for current redistribution in the multilayered PCB. The process describes the operation of the power plane. In act S201, electrical current is received in the power plane from a power source. The power plane and the power source are at substantially the same electrical potential.

In acts S203 and S205, the power plane redistributes current. The power plane includes at least one area that is different from at least one other area. In other words, the power plane includes multiple patterns of conductive material through which current flows differently. The various patterns of conductive material have differences in resistance. The difference in resistance may be set by the shape of the conductive material. In act S203, the power plane steers current in a first direction based on a first pattern, and in act S205, the power plane steers current in a second direction based on the first pattern.

One of the first pattern and the second pattern may be a continuous sheet of conductive material. One of the first pattern and the second pattern may be a hatched pattern in a grid shape. One of the first pattern and the second pattern may be a directional pattern with one resistance in one direction and another resistance in another direction. One of the first pattern and the second pattern may include a multisided shape or gap removed from the conductive material. Other shapes are possible such linked tear drops, circles or ovals.

Figure 12:
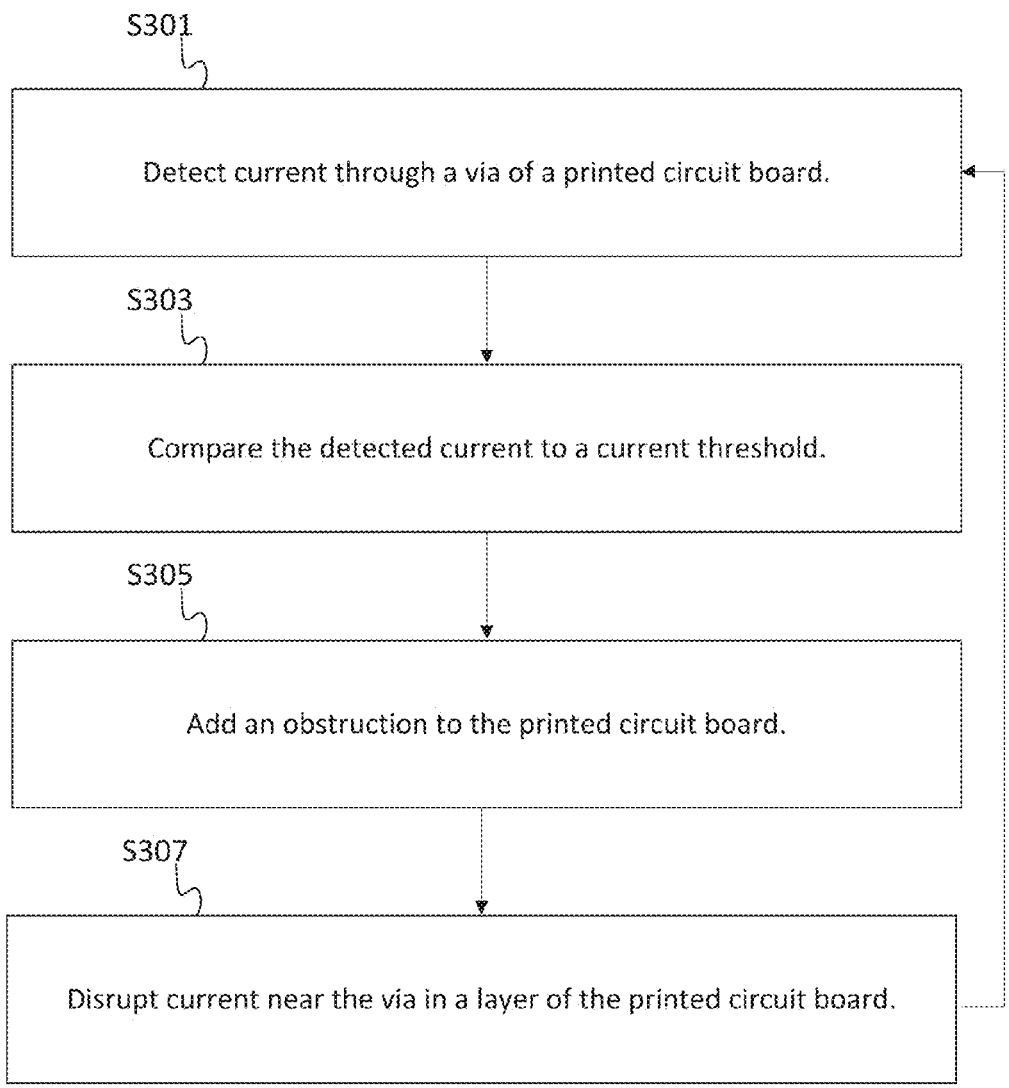
FIG. 12 illustrates an example flowchart for a process for current redistribution around vias.

FIG. 12 illustrates an example flowchart for a process for current redistribution around vias. At act S301, current flowing through one or more vias of a printed circuit board is detected. The detection may be made with an ammeter, voltmeter, or another instrument, or the detection may be made using simulation software.

At act S303, the detected current is compared to a threshold. If the detected current is less than the threshold, no further action may be performed. If the detected current is greater than the threshold, an obstruction may be added to the printed circuit board, at act S305. The obstruction may be added in a power plane layer. The obstruction may be made in a top layer that does not include a power source or sink. The obstruction may be a gap or slit in the layer. The obstruction may be a void around the via. The obstruction may be made physically on a printed circuit board or the made in simulation software. At act S307, the current near the via in the layer of the printed circuit board is disrupted because of the disruption. The current may be lower because of the disruption. A new current may be measured as the process is repeated until the new current is less than the current threshold.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
   a signal layer of a printed circuit board;
   a power plane layer of the printed circuit board; and
   an insulating layer of the printed circuit board between the signal layer and the power plane layer,
   wherein the power plane layer comprises a conducting sheet having a predetermined spatial variation such that current flows in a first area with a discontinuous directional pattern formed in the conductive sheet differently than current flows in a second area with a discontinuous hatched pattern formed in the conductive sheet, and
   wherein the discontinuous directional pattern steers current toward a first region of the power plane, and the discontinuous hatched pattern steers current away from a vertical interconnect access of the row of vertical interconnect accesses in a second region of the power plane, wherein conductors of the direction pattern are diagonal to conductors of the discontinuous hatched pattern and the conductors of the directional pattern are diagonal to a direction of the row of the vertical interconnect access.

2. The apparatus of claim 1, wherein the conductive sheet covers a predetermined percentage of the insulating layer, wherein the predetermined percentage is between 40% and 95% of the insulating layer.

3. The apparatus of claim 1, further comprising:
a power source at a substantially same potential as the power plane layer.

4. The apparatus of claim 1, further comprising:
at least one component electrically coupled to the signal layer and the power plane layer, wherein the at least one component is powered by the current that flows through the first area.

5. The apparatus of claim 1, wherein the discontinuous direction pattern comprises a directional pattern having a high resistance in a first direction and a low resistance in a second direction.

6. The apparatus of claim 1, wherein the first area and the second area are selected to steer current away from a load device.

7. The apparatus of claim 1, wherein the first area and the second area are selected to steer current toward a load device.

8. A method comprising:
receiving electrical current at a power plane of a multi-layer printed circuit board;
steering current in a first direction in the power plane based on a discontinuous hatched pattern of conducting material; and
steering current in a second direction in the power plane based on a direction pattern of parallel portions of conducting material extending in a single direction,
wherein the directional pattern steers current toward a first region of the power plane, and the discontinuous hatched pattern steers current away from a vertical interconnect access of a row of vertical interconnect accesses in a second region of the power plane,
wherein conductors of the direction pattern are diagonal to conductors of the discontinuous hatched pattern and the conductors of the directional pattern are diagonal to a direction of the row of the vertical interconnect accesses.

9. The method of claim 8, wherein the hatched pattern includes a resistance per unit area greater than a resistance per unit area of the directional pattern.

10. The method of claim 8, wherein the directional pattern of conducting material comprises a directional pattern having a high resistance in a first direction and a low resistance in a second direction.

11. The method of claim 8, wherein steering current in the second direction in the power plane redistributes current to the first direction in the power plane.

12. The method of claim 11, wherein redistributing current to the first direction in the power plane reduces current provided to an electrical component below a rated current level for the electrical component.

* * * * *

UNITED STATES PATENT AND TRADEMARK OFFICE
CERTIFICATE OF CORRECTION

PATENT NO.       : 9,468,090 B2
APPLICATION NO.  : 13/662651
DATED            : October 11, 2016
INVENTOR(S)      : Goutham Sabavat et al.

It is certified that error appears in the above-identified patent and that said Letters Patent is hereby corrected as shown below:

Column 10
claim 1, line 56, "and" should be deleted.

Column 10
claim 1, line 57, --a row of vertical interconnect accesses of the printed circuit board; and-- should be inserted -- before "an insulting layer".

Signed and Sealed this
Twentieth Day of December, 2016

Michelle K. Lee
*Director of the United States Patent and Trademark Office*